(12) United States Patent
Debreyer et al.

(10) Patent No.: US 11,882,927 B2
(45) Date of Patent: Jan. 30, 2024

(54) GLASS CERAMIC WORKTOP

(71) Applicant: EUROKERA S.N.C., Chateau-Thierry (FR)

(72) Inventors: Gregory Debreyer, Montcourt Fromonville (FR); Franck Demol, Reims (FR); Nicolas Roux, Chateau-Thierry (FR); Pablo Vilato, Paris (FR)

(73) Assignee: EUROKERA S.N.C., Chateau-Thierry (FR)

( * ) Notice: Subject to any disclaimer, the term of this patent is extended or adjusted under 35 U.S.C. 154(b) by 1448 days.

(21) Appl. No.: 15/756,417

(22) PCT Filed: Sep. 6, 2016

(86) PCT No.: PCT/FR2016/052212
§ 371 (c)(1),
(2) Date: Feb. 28, 2018

(87) PCT Pub. No.: WO2017/042473
PCT Pub. Date: Mar. 16, 2017

(65) Prior Publication Data
US 2018/0249823 A1    Sep. 6, 2018

(30) Foreign Application Priority Data

Sep. 8, 2015    (FR) ...................................... 1558342

(51) Int. Cl.
*A47B 13/12*    (2006.01)
*F24C 7/06*    (2006.01)
(Continued)

(52) U.S. Cl.
CPC ............ *A47B 13/12* (2013.01); *A47B 77/022* (2013.01); *C03C 10/0027* (2013.01);
(Continued)

(58) Field of Classification Search
CPC ............. A47B 13/12; A47B 2220/008; A47B 2220/0091; A47B 77/022; A47B 95/04;
(Continued)

(56) References Cited

U.S. PATENT DOCUMENTS 9,006,620 B2 *   4/2015   Vilato ...................... H05B 3/74
                                                                  219/622
9,568,659 B2 *   2/2017   Verger .............. B32B 17/10036
(Continued)

FOREIGN PATENT DOCUMENTS

CN       201680458 U   12/2010
CN       202209711 U   5/2012
(Continued)

OTHER PUBLICATIONS

International Search Reprot dated Nov. 3, 2016, in PCT/FR2016/052212 filed Sep. 6, 2016.

*Primary Examiner* — Paul R Durand
*Assistant Examiner* — Randall A Gruby
(74) *Attorney, Agent, or Firm* — Element IP, PLC

(57) ABSTRACT

An item of equipment includes at least one worktop formed of at least one substrate made of monolithic glass material with a surface area of greater than 0.7 m². The substrate exhibits a luminosity L* of less than 10, a haze of less than 30% and a light transmission $T_L$ of less than 10%. The item of equipment also includes at least one heating element and at least one interface for communication with at least one element of the worktop and/or with at least one external element for wireless communication. The item of equipment is devoid of light source(s).

18 Claims, 1 Drawing Sheet

(51) Int. Cl.
*F24C 15/10* (2006.01)
*A47B 77/02* (2006.01)
*C03C 10/00* (2006.01)
*F24C 15/20* (2006.01)
*F21V 33/00* (2006.01)
*F21W 131/301* (2006.01)

(52) U.S. Cl.
CPC .............. *F24C 7/067* (2013.01); *F24C 15/10* (2013.01); *F24C 15/102* (2013.01); *A47B 2200/0009* (2013.01); *F21V 33/0012* (2013.01); *F21W 2131/301* (2013.01); *F24C 15/2021* (2013.01)

(58) Field of Classification Search
CPC ........ A47B 2200/0009; C03C 10/0027; C03C 10/00; F24C 15/10; F24C 15/2021; F24C 7/067; F21W 2131/301; F21V 33/0012; H05B 6/1209
See application file for complete search history.

(56) References Cited

U.S. PATENT DOCUMENTS

| | | | | |
|---|---|---|---|---|
| 10,017,415 | B2* | 7/2018 | Plevacova | C03C 10/0027 |
| 10,081,568 | B2* | 9/2018 | Plevacova | C03C 3/089 |
| 10,405,379 | B2* | 9/2019 | Lestringant | H05B 6/1209 |
| 10,455,933 | B2* | 10/2019 | Debreyer | F24C 15/10 |
| 10,542,590 | B2* | 1/2020 | Laurent | C03C 3/089 |
| 2005/0224491 | A1* | 10/2005 | Vilato | C03C 17/30 |
| | | | | 219/443.1 |
| 2010/0089905 | A1* | 4/2010 | Nelson | H05B 3/74 |
| | | | | 428/210 |
| 2010/0155387 | A1* | 6/2010 | Le Gall | B29C 66/1224 |
| | | | | 219/465.1 |
| 2013/0098003 | A1 | 4/2013 | DiGiovanni et al. | |
| 2013/0256301 | A1 | 10/2013 | Laurent et al. | |
| 2013/0286630 | A1 | 10/2013 | Guiset et al. | |
| 2013/0296155 | A1* | 11/2013 | Beall | C03C 10/0027 |
| | | | | 501/32 |
| 2014/0150500 | A1* | 6/2014 | Zachau | C03C 3/085 |
| | | | | 65/33.8 |
| 2017/0016627 | A1* | 1/2017 | Charpentier | F24C 15/10 |
| 2017/0016628 | A1* | 1/2017 | Charpentier | C03C 17/007 |
| 2017/0023260 | A1* | 1/2017 | Charpentier | C03C 10/0054 |
| 2017/0050880 | A1* | 2/2017 | Plevacova | F24B 1/191 |
| 2018/0242729 | A1* | 8/2018 | Debreyer | F24C 15/108 |
| 2018/0242733 | A1* | 8/2018 | Debreyer | A47B 96/18 |
| 2018/0249822 | A1* | 9/2018 | Debreyer | A47B 96/18 |
| 2018/0249824 | A1* | 9/2018 | Debreyer | C03C 3/085 |
| 2018/0270911 | A1* | 9/2018 | Debreyer | C03C 17/002 |
| 2018/0352951 | A1* | 12/2018 | Debreyer | C03C 10/0027 |
| 2018/0363919 | A1* | 12/2018 | Mallet | F24C 15/10 |
| 2019/0059131 | A1* | 2/2019 | Debreyer | H05B 3/74 |
| 2019/0090629 | A1* | 3/2019 | Roux | F24C 15/102 |
| 2019/0128534 | A1* | 5/2019 | Roux | F24C 15/108 |
| 2019/0141795 | A1* | 5/2019 | Roux | F24C 15/30 |
| 2019/0150607 | A1* | 5/2019 | Roux | A47B 13/003 |
| 2019/0246788 | A1* | 8/2019 | Demol | F24C 15/10 |
| 2023/0091446 | A1* | 3/2023 | Debreyer | H05B 3/74 |
| | | | | 219/460.1 |

FOREIGN PATENT DOCUMENTS

| | | |
|---|---|---|
| DE | 102010039058 A1 | 2/2012 |
| EP | 2217036 A | 8/2010 |
| WO | WO 2012/001300 A1 | 1/2012 |
| WO | WO 2012/059664 A1 | 5/2012 |
| WO | WO 2012/080672 A1 | 6/2012 |
| WO | WO 2015/136204 A1 | 9/2015 |

* cited by examiner

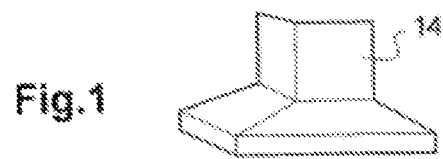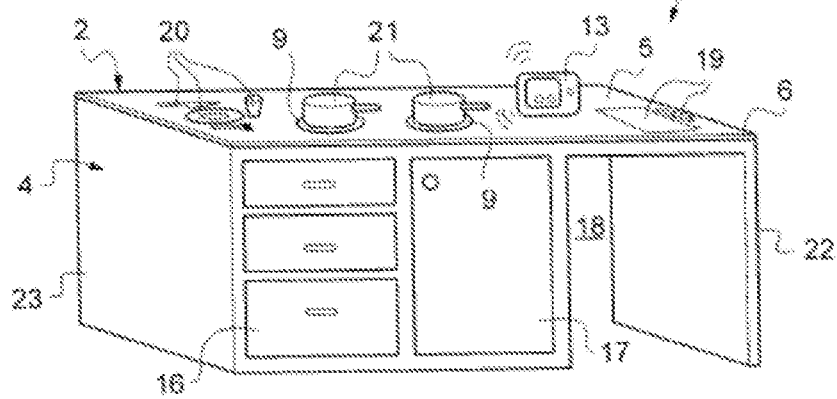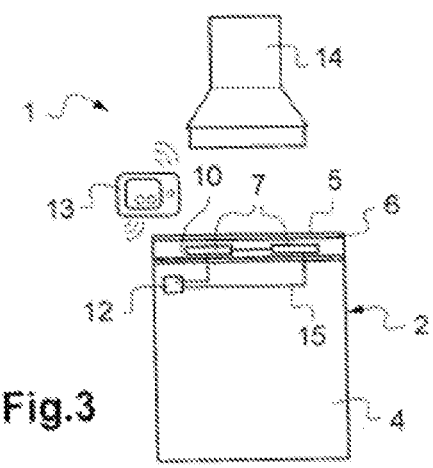

GLASS CERAMIC WORKTOP

The present invention relates to a worktop, or work table or counter or piece of furniture, formed of at least one large-sized plate positioned or intended to be positioned horizontally on one or more supporting elements (casing of a piece of furniture, supporting leg(s)) in order to provide a stable surface intended for different uses. In particular, the present invention relates to a table or a piece of furniture exhibiting a surface or platform (generally horizontal in the position of use) capable of making possible, simultaneously or successively, different activities and/or support for objects (this surface or platform thus forming what is known as a worktop), in particular which can make possible the cooking or the reheating of food in appropriate containers and provide other uses.

The materials normally used to produce worktops are, for example, wood, quartz, Corian® and the like. For the cooking of food, there furthermore exist large-sized cooking surfaces in kitchens, in particular for professional use, these plates generally being metal and/or composite plates. In particular, there exist multilayer panels, based on ceramic layers or materials, such as stoneware, on metal layers or materials of aluminum type or on insulating plastic layers or materials of Bakelite type, these panels exhibiting a high thickness (of the order of 12 mm, for example) and being complex to produce.

At the same time, cooking tops made of materials of strengthened glass or glass-ceramic type, of more limited dimensions (in particular with a surface area generally of less than 0.4 m$^2$, it being possible for plates with a greater surface area to be more difficult to obtain by the processes normally used and to present problems in terms of flatness, handling, and the like), exist, in particular for domestic uses, the use of glass-ceramic material having become widespread in recent years for cooking plates, due in particular to the performance qualities of this material for this use and the attractive appearance of the plates produced.

There currently exist different types of glass-ceramic plates, each variant being the result of major studies and of numerous tests, given that it is very problematic to modify these plates and/or the process by which they are produced without the risk of having an unfavorable effect on the properties desired: in order to be able to be used as cooking plate, a glass-ceramic plate generally has to exhibit a transmission in the wavelengths of the visible region which is both sufficiently low to conceal at least a portion of the underlying heating elements when turned off and sufficiently high for, depending on the situation (radiant heating, induction heating and the like), the user to be able to visually detect the heating elements in the operating state for the purpose of safety; it should also exhibit a high transmission in the wavelengths of the infrared region in the case in particular of plates having radiant heating elements. The plates thus designed are intended exclusively for use as cooking plates and are conventionally neither intended to receive objects other than the heat-resistant utensils used for the cooking of food nor intended for the practice of activities other than the cooking of food.

The present invention has sought to widen the range of the existing household equipment products, having domestic or professional use, by developing interactive products of a novel type making possible more varied uses.

This aim has been achieved by the novel item of equipment or article or installation according to the invention, which is advantageously interactive, this item of furniture/household equipment (or piece of furniture) comprising:

- at least one worktop (or work counter or work table) formed of at least one substrate (in particular plate or surface or platform) made of (or based on or of a or essentially composed of a) monolithic (or monoblock or with just one supporter) glass material (preferably made of glass-ceramic), which is advantageously essentially flat, with a surface area (length times width of its face with the greatest dimensions) of greater than 0.7 m$^2$, said substrate exhibiting a luminosity (or lightness) L* of less than 10, a haze of less than 30% and a light transmission $T_L$ of less than 10%,
- at least one heating element (in particular under the substrate and hidden by the latter when this heating element is not in operation/is turned off),
- at least one interface for communication with at least one element of the top (for example the heating element(s)) and/or, if appropriate, with at least one external element (outside the top), for example with an external module (unit, device), for wireless communication, said item of equipment additionally being devoid of light source(s) or (source(s) having an (exclusive) illumination use).

The product developed according to the invention meets the desired aim, the present invention thus providing a novel interactive item of equipment (making possible in particular the activation of functions, such as the cooking of food) which can be used just as well in the kitchen as in another habitable room, it being possible for the worktop to form part of an uninterrupted or interrupted piece of furniture, of a table, of a counter, and the like, this worktop being mounted or capable of being mounted horizontally on (in particular on the top of) one or more supporting elements (casing of a piece of furniture, supporting leg(s)) in order to provide a stable surface intended for different uses, the worktop or the item of equipment according to the invention exhibiting a continuous upper surface capable of making possible, simultaneously or successively, activities (such as work, games, reading, and the like), the support for objects (such as pieces of paper, computers, vases, dishes, and the like) and the preparation or the cooking or the reheating of food in appropriate containers.

More generally, the invention also relates to a worktop formed of at least one substrate made of monolithic glass material with a surface area of greater than 0.7 m$^2$, said substrate exhibiting a luminosity L* of less than 10, a haze of less than 30% and a light transmission $T_L$ of less than 10%, this worktop being intended to equip a multiuse interactive piece of furniture or item of equipment (intended for multiple uses, such as are listed in the preceding paragraph) as defined above according to the invention.

The invention also relates to the use of a substrate, in particular of a plate, made of monolithic glass material with a surface area of greater than 0.7 m$^2$, said substrate exhibiting a luminosity L* of less than 10, a haze of less than 30% and a light transmission $T_L$ of less than 10%, as multiuse interactive worktop as mentioned in the paragraphs above.

As indicated above, the worktop is formed of a large-sized substrate or plate made of monolithic glass material (the glass material having been formed of a single block/as a single part, even though the substrate can, if appropriate, exhibit recesses, generally produced in the part after it has been formed, for esthetic or functional purposes), the advantage of such a large-sized monolithic plate being in particular that of providing a predominantly continuous/uniform/join-free surface which is attractive and easy to maintain, and also greater comfort of use and greater safety (in terms of impermeability, in the event of spilling liquids, and the like), and the like. The substrate essentially, indeed even solely, comprises the glass material, it being possible for this substrate/glass material, if appropriate, to be provided with thin decorative or functional coatings (in particular of the order of a few tens of nanometers to a few hundred microns, indeed even more, in thickness), for example made of enamel, paint, thin layers and the like, as specified subsequently.

Contrary to the practice in the field of glass-ceramics in particular, this (substrate made of) glass material is large-sized, its surface area (corresponding to the product of its length by its width for its face having the largest dimensions—generally its upper face, which is intended to be visible and to act as support for (household or working or cooking) articles) having dimensions of greater than 0.7 m², preferably of greater than 0.9 m², in particular of greater than 1 m² and especially of greater than or equal to 2 m². In point of fact, the manufacture of large plates, in the case of glass-ceramics in particular, presents numerous problems as regards flatness and handling. In the present invention, a large-sized plate, even so exhibiting a good flatness, can nevertheless advantageously be obtained by reducing the rate of passage (or lengthening the ceramization furnace or increasing the residence time in the furnace), with respect to the speed (or to the standard length of the furnace or to the standard time) normally used to obtain glass-ceramic plates of normal dimensions of less than 0.4 m², as explained subsequently in the process according to the invention.

In the present invention, the substrate made of glass material thus advantageously forms the major part (at least 50%), indeed even all, of the worktop or of its surface or face intended to be used for various purposes (generally upper face in the position of use). In particular, the substrate made of glass material advantageously occupies, in the present invention, at least 50%, in particular at least 70%, especially at least 90%, of the surface (generally measured on the upper face, intended to be visible and to be used as support for articles) of the worktop, and it generally occupies the entire surface of the worktop, the surface of the worktop being understood as the uninterrupted surface occupied by the worktop (surface which it occupies with the exclusion of that/those occupied by possible recesses (such as a recess in the top for incorporating a sink)) on the face under consideration (generally its upper face, intended to be visible and to act as support for articles), indeed even being understood in particular as the overall surface corresponding to the product of the length of the worktop by its width). Depending on the type of piece of furniture (in particular in the case of a piece of furniture where the worktop occupies the whole of one of its faces, generally the upper face, for example a table, a central island or a simple worktop), the substrate made of glass material can thus also occupy at least 50%, in particular at least 70%, especially at least 90%, of the surface of a face, in particular of the upper face (in the position of use), of the piece of furniture, indeed even occupy all of said surface.

Advantageously, the substrate made of glass material forms at least 50%, in particular at least 70%, especially at least 90%, indeed even the whole, of the worktop or, in other words, the worktop (generally on the upper face or forming the upper face of the piece of furniture) is mainly (to at least 50%, in particular at least 70%, especially at least 90%), in particular entirely (or solely), formed of (or constituted by the, or consists of the) substrate made of glass material (this glass material preferably being glass-ceramic).

The substrate/glass material according to the invention is advantageously flat (or predominantly or virtually flat) and in particular exhibits a flatness (height between the highest point and the lowest point of the substrate, with respect to the mean plane of the substrate, excluding any possible deliberate deformations produced on the substrate for esthetic or functional purposes) of less than 0.1% of the diagonal of the substrate and preferably of less than 3 mm, in particular of less than 2 mm, especially of less than 1 mm, indeed even of the order of zero, depending on the size/surface area/diagonal of the substrate, the flatness being measured using a SurFlat reference waviness meter sold by Visuol. The substrate is generally of geometric shape, in particular rectangular, indeed even square, indeed even circular or oval, and the like, and generally exhibits an "upper" face (face which is visible) in the position of use, another "lower" face (generally hidden, in the framework or casing of the piece of furniture incorporating the worktop) in the position of use, and an edge face (or edge or thickness). The upper face is generally flat and smooth but may also exhibit at least one protruding zone and/or at least one recessed zone and/or at least one opening and/or beveled edges (these shapes having been added during the manufacture of the substrate, for example by rolling, gravity bending or pressing, and the like, or having been added in off-line operations), and the like, these variations in shape advantageously constituting continuous variations in the plate (without change in materials or joins). The lower face can in particular be smooth or provided with tear drops increasing its mechanical strength and obtained, for example, by rolling.

The thickness of the substrate made of monolithic glass material is generally at least 2 mm, in particular at least 2.5 mm, especially is of the order of 3 to 30 mm, and advantageously is less than 15 mm, especially is of the order of 3 to 15 mm and in particular of 3 to 10 mm.

The glass material of the substrate used is advantageously resistant to high temperatures and/or exhibits an expansion coefficient of zero or virtually zero (for example of less than $15.10^{-7}$ $K^{-1}$) and in particular is advantageously glass-ceramic or a strengthened (in particular chemically or thermally tempered) glass. Preferably, the substrate is a substrate made of glass-ceramic. As defined according to the invention, the substrate/glass material is advantageously weakly transmitting, not very scattering and dark in color (defined by the luminosity L*), in particular black or dark brown in color, this material making possible in particular a display by light transmission through the substrate, as specified below.

The glass-ceramic used can in particular have a composition as described in the patent applications published under the following numbers: WO2012156444, WO2012001300, DE202012011811, this glass-ceramic being in particular a lithium aluminosilicate glass-ceramic.

Use is advantageously made, for example, of a glass-ceramic comprising the following constituents and/or obtained by ceramization starting from a glass with the following composition, within the limits below, expressed by percentages by weight: $SiO_2$: 52-75%; $Al_2O_3$: 18-27%; $Li_2O$: 2.5-5.5%; $K_2O$: 0-3%; $Na_2O$: 0-3%; $ZnO$: 0-3.5%; $MgO$: 0-3%; $CaO$: 0-2.5%; $BaO$: 0-3.5%; $SrO$: 0-2%; $TiO_2$: 1.2-5.5%; $ZrO_2$: 0-3%; $P_2O_5$: 0-8%, and preferably, within the limits below, expressed as percentages by weight: $SiO_2$: 64-70%; $Al_2O_3$: 18-21%; $Li_2O$: 2.5-3.9%; $K_2O$: 0-1.0%; $Na_2O$: 0-1.0%; $ZnO$: 1.2-2.8%; $MgO$: 0.20-1.5%; $CaO$: 0-1%; $BaO$: 0-3%; $SrO$: 0-1.4%; $TiO_2$: 1.8-3.2%; $ZrO_2$: 1.0-2.5%.

The glass-ceramic may be refined with arsenic (that is to say, have (a mother glass with) a composition comprising of the order of 0.5% to 1.5% by weight of arsenic oxide (expressed as $As_2O_3$)) or may not be refined with arsenic (in particular exhibiting a content of arsenic oxides of less than 0.2%, in particular of less than 0.1%, indeed even zero) or refined with tin or refined with sulfide(s), and may be obtained by rolling or by the float glass process.

The glass material can also be a nonceramized tempered glass, for example a tempered lithium aluminosilicate, such as described in the patent applications published under the following numbers: FR 1 060 677 and WO2012080672, or in the application filed in France under the number 1363157, or else a tempered glass of another type (soda-lime, borosilicate, and the like), for example as described in the application published under the number WO2012146860.

The glass-ceramic or the tempered glass are obtained by the respective processes described in the abovementioned documents using the treatment temperatures and cycles which make it possible to obtain the glass material exhibiting the selected characteristics given in the definition of the invention. In the case of the glass-ceramics, these processes are preferably modified by reducing the rate of passage by at least 25%, preferably by at least 50%, or by increasing the length of the ceramization furnace or the residence time in said furnace by at least 25%, preferably by at least 50%, with respect to the rates, lengths and times, respectively, normally used, in order to obtain a large-sized flat substrate as required according to the invention, as explained subsequently.

As defined according to the invention, the substrate forming the worktop is selected so as to exhibit a luminosity L* of less than 10, preferably of less than 5, in particular of less than 4, indeed even of less than 2, a haze of less than 30%, in particular of less than 28%, and a light transmission $T_L$ of less than 10%, in particular of less than or equal to 5%, in particular of 0.8% to 5%, this light transmission preferentially being nonzero (greater than 0%). The substrate exhibits these characteristics over the majority (in particular over at least 80%, indeed even over 100%) of its surface, except for possible localized decorations (for example made of enamel) or localized components applied to its surface. These properties are generally those of the glass material forming the substrate in itself, without the presence of any one coating, but, if appropriate, can result from the combination of the glass material and of a coating applied over the majority of one and/or the other of its faces. Advantageously, it is a matter of the intrinsic characteristics of the substrate made of glass material, that is to say that said substrate made of glass material exhibits these characteristics in itself without the presence of any one coating.

The luminosity L* is a component defined in the CIE colorimetric system and is evaluated in a known way, using in particular a Byk-Gardner Color Guide 45/0 colorimeter (colorimetry in reflection), on the upper side of the substrate placed on an opaque white background.

The haze measures the level of light scattering and is defined, in the context of the invention, as being the ratio of the diffuse transmission to the total transmission at a wavelength equal to 550 nm, this haze being evaluated, for example, using the spectrophotometer equipped with an integrating sphere used for the light transmission measurements.

The light transmission $T_L$ is measured according to the standard ISO 9050:2003 using the illuminant D65 and is the total transmission (integrated in the visible region), taking into account both direct transmission and possible diffuse transmission, the measurement being carried out, for example, using a spectrophotometer equipped with an integrating sphere, the measurement at a given thickness subsequently being converted, if appropriate, to the reference thickness of 4 mm according to the standard ISO 9050:2003.

The substrate according to the invention as defined above is in particular dark in appearance and is formed of a weakly transmitting and not very scattering material, in particular has a black or brown appearance, making it possible in particular to signal the cooking zones when they are in the operating state, while masking the underlying elements, in particular when turned off. The glass material used also preferably exhibits an opacity indicator (or factor or coefficient) $\Omega$ of less than 100 and advantageously of greater than 93, in the present invention this opacity indicator being determined by the formula $\Omega=100-\Delta E^*$ and being evaluated by measuring (colorimetry in reflection carried out using a Byk-Gardner Color Guide 45/0 colorimeter) the variation in color $\Delta E^*$, corresponding to the difference between the color, measured in reflection on the upper face of the substrate, for the substrate placed on an opaque black background and the color for the substrate placed on an opaque white background $(\Delta E^*=((L_B^*-L_W^*)^2+(a_B^*-a_W^*)^2+(b_B^*-b_W^*)^2)^{1/2}$, $L_W^*$, $a_W^*$ and $b_W^*$ being the color coordinates of the first measurement on the white background and $L_B^*$, $a_B^*$ and $b_B^*$ being those of the second measurement on the black background in the colorimetric system established by the CIE in 1976).

The substrate is preferably based on a black glass-ceramic generally comprising crystals of β-quartz structure within a residual vitreous phase, the absolute value of its expansion coefficient advantageously being less than or equal to $15.10^{-7}/°$ C., indeed even less than or equal to $5.10^{-7}/°$ C., and exhibiting the abovementioned characteristics, such as the glass-ceramic of the plates sold under the KeraBlack+ name by Eurokera. In particular, it can be a glass-ceramic refined with arsenic with a composition as described in the patent application EP 0 437 228 or U.S. Pat. No. 5,070,045 or FR 2 657 079, or a glass ceramic refined with tin, exhibiting a content of arsenic oxides of less than 0.2% (indeed even of less than 0.1%, indeed even of less than or equal to 500 ppm, indeed even zero), for example with a composition as described in the patent application WO 2012/156444, or also refined with sulfide(s), as described in the patent application WO2008053110.

If appropriate, the substrate can also comprise colorants, for example giving certain shades or tints, at contents preferably of less than 10% by weight, for example vanadium oxide, iron oxide, cobalt oxide, cerium oxide, selenium oxide, chromium oxide, indeed even nickel oxide, copper oxide and/or manganese oxide, and the like.

As defined above, the article according to the invention also comprises at least one heating element, for example one or more radiant or halogen heating elements or one or more gas burners and/or one or more inductive heating means, these heating means generally being located under the worktop and hidden by the latter when turned off. The worktop of the article according to the invention can comprise one or more heating elements as well as one or more stove top burners. The term "stove top burner" is understood to mean a cooking location. The article according to the invention can comprise several types of heating elements or stove top burners (stove top gas burners, stove top radiant burners, halogen stove top burners or inductive stove top burners). Preferably, the article according to the invention comprises, as heating element(s), one or more inductive heating means.

The heating mean(s) can be located in a defined zone (for example on one end of the substrate) or several zones of the substrate or can be uniformly distributed under the substrate, for example occupying at least 25% of the surface area of the substrate, indeed even can occupy a surface area virtually equivalent to that of the substrate (for example more than 50%, in particular more than 75%, indeed even more than 85%, indeed even 100%, of the main surface area of the substrate), a plurality of small-sized inductors, for example, lining the substrate under its lower face, in order to make possible heating, if necessary, in any zone.

The cooking locations on the worktop, straight above the heating means, can be signaled (or not, in the case, for example, of a top equipped with heating means covering the whole of its areal extent), on activation and/or permanently, in particular by means of a permanent decoration, for example made of enamel. The patterns making it possible to signal the cooking zones (as well as patterns which may signal other zones or functions or form decorations) can be larger or smaller in size; for example, they may be circles, each delimiting heating elements, or small patterns (triangles, crosses, and the like) at the center thereof or at the base thereof, and the like. The absence of light sources, integrated in the item of equipment, for signaling, for example, the heating zones (the latter being signaled, if need be, by fixed patterns in the present invention) or for illuminating the displays or producing other light effects, exhibits the advantage of being more economical, of making the item of equipment easier to maintain, of offering greater safety and simplicity in the handling of the item of equipment, said item of equipment generally being intended to be used in environments already provided with sources of illumination (natural or artificial sources of illumination, such as a living room, a terrace, and the like).

Preferably, the cooking locations (and/or, if appropriate, other zones and/or elements and/or functions and/or decorations) are thus signaled permanently by a fixed pattern (in particular of round circle, cross, triangle, rectangle, or other non-geometric decoration, and the like, type), in particular obtained by deposition of layer(s) (especially such as those used for the decoration of glass-ceramics), for example made of enamel or optionally paint, at the surface of the plate (in particular on the upper face, or optionally or the lower face according to the type of coating).

If appropriate, a portion or one of the faces, in particular the upper (in the position of use) or visible face, of the plate can be provided with a functional and/or decorative, for example opacifying, coating, in particular with an enamel or with thin layers, the degree of coverage of said opacifying coating in the coated zone being at least 1%, in particular at least 5%, preferably at least 20%, especially at least 45%, indeed even 100%.

As indicated above, the item of equipment according to the invention also comprises at least one interface for communication with at least one element of the top (such as the heating element(s)) and/or with an element external to the top, for example for wireless communication.

This (in particular man-machine or machine-machine) communication interface can be a device which makes it possible in particular to control or to transmit commands to the heating elements from or via control buttons or keys integrated into the worktop or offset onto an external element which is advantageously detachable or movable, in the case in particular of a command by wireless communication.

Preferably, the interface makes possible wireless communication with a unit external to the worktop (it being possible for this unit to form part of the item of equipment according to the invention and to itself constitute an interface), for example making possible the remote activation of the heating zones and/or the control of different functions (increase or decrease in the power or in the heating time, and the like), the commands given by the external unit being transmitted by the interface to the relevant components of the item of equipment. The interface can also be a control interface located on the top (control panel) which transmits the commands by wires or optionally wirelessly to other components of the top or outside the top.

The external unit in the case of remote control can, for example, be in the form of a keyboard, a tablet, a touch screen or a cellphone, it being possible for this unit to be stationary (for example fastened to a wall) or movable (being able, if appropriate, to be placed on the worktop). This embodiment exhibits in particular the advantage of preventing finger marks (which are unsightly and obvious on glass materials) on the worktop or the cooking zones. Remote activation of the controls also makes it possible to reduce the risks of burns as the controls dose to the cooking zones are not handled. For the sake of safety in particular, the wireless communication can advantageously be planned to be of limited range (for example range limited to the volume of the room in which the item of equipment is located) and/or equipped with safety features in order to prevent inadvertent activation by a person not present. The wireless communication in particular is achieved via electromagnetic or radio waves, if appropriate using systems of Bluetooth, WLAN, Wi-Fi, RFID chip, and the like, type.

The interface can make it possible to transmit different signals initiated by contact or even by movement in order to activate different components (for example, it may convert a movement, detected by sensors by triangulation, these sensors being connected to this interface (and if appropriate forming part thereof), into the activation of a function (for example the increase in the heating power, and the like)).

At least one interface is generally located on or under the worktop or close by. The item of equipment according to the invention can also comprise several interfaces, of the same type or different types, for example making possible the activation of different elements, or the item of equipment can comprise several interfaces, if appropriate functioning differently (of different composition, operating at different frequencies, and the like), for managing one and the same element (for example a heating zone) with a higher level of safety. The interface can be formed of sensor(s), connector(s), control element(s), any other electrical or electronic or electromagnetic component, and the like. One or more control means or zones (in the form of keys, logos, indeed even keyboards, and the like) or indicators (of intensities, of power, of time, and the like), which are, for example, capable of being activated by contact on the surface of the top or remotely (in particular by wireless communication) or by simple movement of the hand, as already mentioned (by sensors located, if appropriate, on the exterior and recording the movement, for example by triangulation, in order to convert it, in particular using a suitable algorithm and a suitable interface, into the activation of a function, for example), or, if appropriate, by placing a predetermined object (saucepan, and the like) at a predetermined location (such as a cooking zone) of the plate, can be connected to or form part of the interface(s).

Apart from the interface, the item of equipment or worktop can be equipped with different cables, connectors or other elements, in particular of electrical nature, which contribute to the transmission of commands from one part of the item of equipment to the other.

The item of equipment, in particular the worktop, according to the invention can also comprise various functional and/or decorative coatings in particular among those generally used with the glass materials in question, for example based on enamel, on paint, on thin (for example metal, dielectric, and the like) layer(s), and the like. For example, one of the faces of the substrate can comprise one or more enamel layers or one or more enamel patterns having a decorative purpose and/or in order to signal one or more elements (display devices, cooking zones, and the like) and/or acting as masking (in order, for example, to prevent the elements placed under the substrate from being directly visible, this masking, however, not being necessary with the substrates selected according to the invention) and/or for other functions. In particular, the worktop can be equipped with a functional layer which confers on it one or more additional properties, such as anti-scratch, mechanical strengthening, anti-fingerprint, anti-overflow, and the like, properties. The coating can, for example, be formed by processes such as screen printing, cathode sputtering or pneumatic spraying deposition, inkjet printing, enamel jet printing, and the like, it being possible for the coating to be applied in particular, depending on the type of coating and on the desired function, to the visible face or to the opposite face. For example, in the case of a decoration by enamel, the latter is preferably deposited on the upper face for reasons of visibility in particular, while an opacifying layer made of paint is preferably deposited on the opposite nonvisible face for better protection against abrasion in particular, and the like.

The present invention also relates to a process for the manufacture of an item of equipment according to the invention, in particular of the worktop of said item of equipment, when this worktop is formed of at least one glass-ceramic substrate with a surface area of greater than 0.7 m², in which at least one cycle of ceramization of a glass plate with a surface area of greater than 0.7 m² is carried out in order to obtain said substrate, and according to which the rate of passage is reduced by at least 25%, preferably by at least 50%, or the length of the ceramization furnace or the residence time in said furnace is increased by at least 25%, preferably at least 50%, with respect to the optimal or normal rate, length or residence time respectively, in order to obtain a glass-ceramic substrate with a surface area of less than 0.4 m².

For the record, glass-ceramic plates are generally manufactured as follows: glass with the composition chosen for forming the glass-ceramic is melted in a melting furnace, the molten glass is then rolled to give a standard ribbon or sheet by passing the molten glass between forming rollers, and the glass ribbon is cut to the desired dimensions. Alternatively to the rolling, the glass can be produced by the float glass process, as described, for example, in the patent application WO2008056080, before, if appropriate, being cut up. The plates, already or not yet cut up, are subsequently ceramized in a way known per se, the ceramization consisting in baking the plates according to the temperature profile chosen in order to convert the glass into the polycrystalline material referred to as "glass-ceramic", the expansion coefficient of which is zero or virtually zero and which withstands a thermal shock which can range up to 700° C. The ceramization generally comprises a stage of gradual rise in the temperature up to the nucleation range, generally located in the vicinity of the range for transformation of the glass; a stage, lasting several minutes, of passing through the nucleation range; a new gradual rise in the temperature up to the temperature of the ceramization stationary phase; the maintenance of the temperature of the ceramization stationary phase for several minutes; and then a rapid cooling down to ambient temperature. If appropriate, the process also comprises a cutting operation (generally before ceramization), for example with a water jet, mechanical marking out with a cutting wheel, and the like, followed by a shaping operation (grinding, beveling, and the like). The process can also comprise a stage of rolling or gravity bending in order to form specific protrusions.

In the present invention, the glass-ceramic follows a ceramization cycle which gives it the desired properties, in particular a not very transmitting and not very scattering dark/black/brown appearance.

Other advantageous characteristics and details will emerge below from the description of a nonlimiting embodiment of the invention, with reference to the appended drawings, in which:

FIG. 1 represents a diagrammatic perspective view of an item of equipment according to the invention;

FIG. 2 represents a diagrammatic top view of a similar item of equipment (the utensils at the surface or the underlying elements of the piece of furniture not being represented);

FIG. 3 represents a diagrammatic side view in which a section of the piece of furniture (23) has been removed in order to reveal certain components of the item of equipment.

In this example, the item of equipment (1) according to the invention comprises a piece of furniture (2) formed of a casing (4) surmounted by a worktop (5) formed of at least one monolithic substrate (6) made of glass-ceramic with a surface area of 3.8 m², this substrate occupying the majority (in this instance all) of the surface (measured on the upper face) of the worktop. This substrate is, for example, a plate of the type of that sold under the KeraBlack+ reference by Eurokera, this plate exhibiting a smooth upper face and a lower face provided with tear drops, and a thickness of 12 mm, and exhibiting a luminosity L* of 0.07, a haze of 0.3%, a light transmission $T_L$ of 0.15% and an opacity indicator of 99.4. This substrate is, for example, obtained by proceeding as in the patent application WO2012156444 but by reducing the rate of passage in the ceramization furnace by 50%.

Alternatively, this substrate can also, for example, be a plate of 4.2 m² made of glass-ceramic of the type of that sold under the KeraVision reference by Eurokera, this plate exhibiting a smooth upper face and a smooth lower face, and a thickness of 4 mm, and exhibiting a luminosity L* of 0.6, a haze of 1.2%, a light transmission $T_L$ of 4.2% and an opacity indicator of 95.92. This substrate is, for example, obtained by proceeding as in the patent application WO2012001300 but by reducing the rate of passage in the ceramization furnace by 50%.

The substrate used exhibits a black color (in both the abovementioned cases). In both cases, the substrate made of glass-ceramic obtained exhibits a flatness of less than 2 mm (the flatness obtained being between 2 and 3 mm for a rate reduced by only 25% and being more than 15 mm for a rate unchanged with respect to that used in the abovementioned patent application to order to obtain a plate with standard dimensions of less than 0.4 m²), the flatness desired for good optical properties and good coupling and thermal efficiency properties in particular being less than 3 mm and preferably less than 2 mm.

The item of equipment additionally comprises, in the present example, two heating elements (7), for example inductors, positioned under the plate (6). These inductors are, in the present case, toward the middle of the work surface but might just as easily be located at one end of the top.

The item of equipment also comprises decorations (9), for example made of enamel, intended to signal the cooking locations and placed, for example, on the upper face of the substrate. These decorations, for example in the form of circles of color (9) delimiting each location (it being possible for the colors, if appropriate, to be identical or different according to the locations) and encircling the inductors, make it possible to signal the cooking locations in order to prevent contact with them when the heating elements are activated.

The item of equipment additionally comprises at least one interface (12) (hidden by the substrate) for communication with the heating elements, this interface also communicating wirelessly with an external unit in the form, for example, of a touch tablet (13) for the activation of different zones and functions of the plate or of the item of equipment. The external unit can be advantageously movable and lie on the worktop (FIG. 1) or be used for the remote activation (FIG. 3) of different zones or functions. Alternatively or cumulatively, the interface might also comprise or be connected to a permanent control panel located on the surface of the substrate (2) for the activation of different zones and functions, in particular of the substrate.

If appropriate, the item of equipment can also be combined with or comprise a suction hood (14) overhanging the worktop. The item of equipment also comprises other elements, in particular electrical cables (15) for the activation of the heating elements, and comprises drawers (16) or cupboards (17) inserted into the casing supporting the worktop, for storing various articles, and the like. The item of equipment can also comprise other elements; for example, the worktop can comprise a trim, the substrate can be coated with a localized or nonlocalized permanent decoration, for example made of enamel, the casing can be uninterrupted or comprise different recesses (such as the recess (18)) or integrate other elements (for example a built-in oven, and the like). The worktop (5) can be used for different purposes, such as writing (as symbolized by the paper and the pen (19)), the support for objects (as symbolized by the tableware (20)), while making possible the cooking of food (as symbolized by the cooking receptacles (21)), and the like. If appropriate, the casing can also be replaced by supporting legs (for example only the walls 22 and 23, or four legs at the four corners, the item of equipment under the worktop in this case preferably being hidden by a localized enclosure with a thickness of a few centimeters under the substrate), such as a table.

The item of equipment according to the invention can in particular be advantageously used to produce a new range of interactive and multiuse pieces of furniture in particular integrating cooking zones or a cooking function.

The invention claimed is:

1. An item of equipment, comprising:
   at least one worktop formed of at least one substrate made of monolithic glass material with a surface area of greater than 0.7 m$^2$, said substrate exhibiting a luminosity L* of less than 10, a haze of less than 30% and a light transmission $T_L$ of less than 10%,
   at least one heating element,
   at least one interface for communication with said at least one heating element and/or with another element of the worktop and/or with at least one external element for wireless communication,
   said item of equipment additionally being devoid of light source(s).

2. The item of equipment as claimed in claim 1, wherein the surface area of the substrate made of glass material is greater than 0.9 m$^2$, the thickness of said substrate is at least 2 mm, and the thickness of the substrate is less than 30 mm.

3. The item of equipment as claimed in claim 1, wherein the substrate made of glass material occupies at least 50% of the surface area of the worktop.

4. The item of equipment as claimed in claim 1, wherein the substrate is made of tempered glass or of glass-ceramic.

5. The item of equipment as claimed in claim 1, wherein a flatness of the substrate is less than 0.1% of the diagonal of the substrate or is less than 3 mm.

6. The item of equipment as claimed in claim 1, wherein the substrate is dark in appearance and exhibits a luminosity L* of less than 5, and/or a haze of less than 28%, and/or a light transmission $T_L$ of less than or equal to 5%, the light transmission $T_L$ being nonzero.

7. The item of equipment as claimed in claim 1, wherein the substrate or the glass material exhibits an opacity indicator of less than 100 and greater than 93.

8. The item of equipment as claimed in claim 1, wherein the item of equipment comprises, as the heating element(s), one or more inductors.

9. The item of equipment as claimed in claim 1, wherein a visible face of the substrate is coated with an opacifying coating, a degree of coverage of said opacifying coating in a coated zone being at least 5%.

10. The item of equipment as claimed in claim 1, wherein the at least one heating element is capable of being activated by contact on a surface of the worktop and/or on said at least one interface for communication and/or on said at least one external unit, or by movement of a hand.

11. The item of equipment as claimed in claim 1, wherein the interface is configured to perform wireless communication with a unit external to the worktop.

12. The item of equipment as claimed in claim 1, wherein the worktop comprises one or more functional and/or decorative coatings.

13. The item of equipment as claimed in claim 1, wherein the worktop is mounted on at least one supporting element, thus forming a table, an uninterrupted or interrupted piece of furniture, or a counter.

14. A method, comprising:
   obtaining a substrate made of monolithic glass material with a surface area of greater than 0.7 m$^2$, said substrate exhibiting a luminosity L* of less than 10, a haze of less than 30% and a light transmission $T_L$ of less than 10%; and
   using the substrate with the item of equipment as claimed in claim 1.

15. The item of equipment as claimed in claim 1, wherein the thickness of said substrate is 3 to 30 mm.

16. The item of equipment as claimed in claim 1, wherein the substrate exhibits a flatness of less than 2 mm.

17. The item of equipment as claimed in claim 1, wherein the interface is configured to perform wireless communication with a unit external to the worktop to remotely activate the at least one heating element and/or control different functions of the item of equipment.

18. A worktop, comprising:
   at least one substrate made of monolithic glass material with a surface area of greater than 0.7 m$^2$, said substrate exhibiting a luminosity L* of less than 10, a haze of less than 30% and a light transmission $T_L$ of less than 10.

* * * * *